United States Patent
Mo (10) Patent No.: US 12,538,361 B2
(45) Date of Patent: Jan. 27, 2026

(54) METHOD FOR SETTING DATA TRANSMISSION TYPE AND TERMINAL

(71) Applicant: VIVO MOBILE COMMUNICATION CO., LTD., Guangdong (CN)

(72) Inventor: Yitao Mo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 456 days.

(21) Appl. No.: 18/157,584

(22) Filed: Jan. 20, 2023

(65) Prior Publication Data

US 2023/0156814 A1 May 18, 2023

Related U.S. Application Data

(63) Continuation of application No. PCT/CN2021/110531, filed on Aug. 4, 2021.

(30) Foreign Application Priority Data

Aug. 6, 2020 (CN) .......................... 202010785209.9

(51) Int. Cl.
*H04W 74/08* (2024.01)
*H04W 74/0833* (2024.01)
*H04W 74/0836* (2024.01)

(52) U.S. Cl.
CPC .... *H04W 74/0833* (2013.01); *H04W 74/0836* (2024.01)

(58) Field of Classification Search
CPC ...................... H04W 74/0833; H04W 74/0836
See application file for complete search history.

(56) References Cited

U.S. PATENT DOCUMENTS

| | | | |
|---|---|---|---|
| 2018/0152907 A1* | 5/2018 | Zhang | H04B 7/0421 |
| 2020/0053791 A1 | 2/2020 | Ozturk et al. | |
| 2020/0314820 A1 | 10/2020 | Kim et al. | |
| 2021/0352683 A1 | 11/2021 | Han et al. | |
| 2023/0020533 A1* | 1/2023 | Wang | H04L 5/0064 |
| 2023/0030443 A1* | 2/2023 | Chen | H04W 72/23 |

FOREIGN PATENT DOCUMENTS

| | | |
|---|---|---|
| CN | 110012551 A | 7/2019 |
| CN | 110913499 A | 3/2020 |
| GB | 2593537 A | 9/2021 |
| JP | 2023534881 A | 8/2023 |

(Continued)

OTHER PUBLICATIONS

Extended European Search Report regarding European Patent Application No. 21852483.3, dated Dec. 5, 2023.

(Continued)

*Primary Examiner* — Brenda H Pham
(74) *Attorney, Agent, or Firm* — Harness, Dickey & Pierce, P.L.C.

(57) ABSTRACT

A method for setting a data transmission type includes: setting, by a terminal, a target transmission type according to at least one of following: network configuration, path loss, size of uplink data, and fallback indication, where the target transmission type includes one of a small data transmission type based on configured grant, a small data transmission type based on random access, and a random access type.

20 Claims, 3 Drawing Sheets

200

A terminal sets a target transmission type according to at least one of the following: network configuration, path loss, size of uplink data, and fallback indication ~ S202

(56) References Cited

FOREIGN PATENT DOCUMENTS

| JP | 7599549 B2 | 12/2024 |
| WO | WO-2018232321 A2 | 12/2018 |
| WO | WO-2019098784 A1 | 5/2019 |
| WO | WO-2020067790 A1 | 4/2020 |
| WO | WO-2020078415 A1 | 4/2020 |
| WO | WO-2020088097 A1 | 5/2020 |

OTHER PUBLICATIONS

Office Action regarding Japanese Patent Application No. 2023-505422, dated Dec. 21, 2023. Translation provided by Bohui Intellectual Property.
"2 step RA: Selection between 2 step RACH and 4 step RACH," Samsung, 3GPP TSG-RAN2 107, R2-1908812, dated Aug. 30, 2019.
"Further considerations on RACH optimization," ZTE Corporation, Sanechips, 3GPP TSG RAN WG2#109-e, R2-2000805, dated Mar. 6, 2020.
First Office Action regarding Chinese Patent Application No. 202010785209.9, dated Dec. 12, 2023. Translation provided by Bohui Intellectual Property.
International Search Report and Written Opinion of the International Searching Authority regarding International Patent Application No. PCT/CN2021/110531, dated Sep. 28, 2021. Translation provided by Bohui Intellectual Property.
Decision of Refusal regarding Japanese Patent Application No. 2023-505422, dated May 24, 2024.
3GPP TS 36.331, v15.5.0, 3rd Generation Partnership Project; Technical Specification Group Radio Access Network;. Evolved Universal Terrestrial Radio Access (E-UTRA); Radio Resource Control (RRC); Protocol specification (Release. 15), Mar. 2019.
First Office Action regarding Japanese Patent Application No. 2024-170532, dated Jun. 24, 2025. Translation provided by Bohui Intellectual Property.

\* cited by examiner

A terminal sets a target transmission type according to at least one of the following: network configuration, path loss, size of uplink data, and fallback indication ~ S202

METHOD FOR SETTING DATA TRANSMISSION TYPE AND TERMINAL

CROSS-REFERENCE TO RELATED APPLICATIONS

This application is a Bypass Continuation Application of PCT/CN2021/110531, filed on Aug. 4, 2021, which claims priority to Chinese Patent Application No. 202010785209.9, filed on Aug. 6, 2020, which are incorporated herein by reference in their entirety.

TECHNICAL FIELD

This disclosure pertains to the field of communication technologies, and specifically, relates to a method for setting a data transmission type and a terminal.

BACKGROUND

Small data transmission is mainly for machine type communications (MTC), featuring periodic or burst transmission of small data packets sized tens to hundreds of bits. Small data transmission may need only an uplink transmission function or only a downlink transmission function, for example, sensor devices acquiring data or actuator devices executing control commands.

SUMMARY

Embodiments of this disclosure provide a method for setting a data transmission type and a terminal.

According to a first aspect, a method for setting a data transmission type is provided. The method includes: setting, by a terminal, a target transmission type according to at least one of the following: network configuration, path loss, size of uplink data, or fallback indication, where the target transmission type includes one of a small data transmission type based on configured grant, a small data transmission type based on random access, and a random access type.

According to a second aspect, a terminal is provided, including: a transmission type setting module, configured to set a target transmission type according to at least one of the following: network configuration, path loss, size of uplink data, or fallback indication, where the target transmission type includes one of a small data transmission type based on configured grant, a small data transmission type based on random access, and a random access type.

According to a third aspect, a terminal is provided. The terminal includes a processor, a memory, and a program or instructions stored in the memory and executable on the processor, and when the program or instructions are executed by the processor, the method according to the first aspect is implemented.

According to a fourth aspect, a non-transitory readable storage medium is provided. The non-transitory readable storage medium stores a program or instructions, and when the program or instructions are executed by a processor, the method according to the first aspect is implemented.

According to a fifth aspect, a computer program product is provided. The computer program product includes a processor, a memory, and a program or instructions stored in the memory and executable on the processor, and when the program or instructions are executed by the processor, the method according to the first aspect is implemented.

According to a sixth aspect, a chip is provided. The chip includes a processor and a communications interface. The communications interface is coupled to the processor, and the processor is configured to execute a program or instructions to implement the method according to the first aspect.

DETAILED DESCRIPTION OF THE EMBODIMENTS

The technical solutions in the embodiments of this disclosure are described below clearly with reference to the accompanying drawings in the embodiments of this disclosure. Apparently, the embodiments described are some rather than all of the embodiments of this disclosure. All other embodiments derived by persons of ordinary skill in the art based on the embodiments of this disclosure fall within the scope of protection of this disclosure.

The terms such as "first" and "second" in this specification and claims of this disclosure are used to distinguish between similar objects rather than to describe a specific sequence or chronological order. It should be understood that the terms used with such purpose are interchangeable under appropriate conditions so that the embodiments of this disclosure can be implemented in other orders than those illustrated or described in this specification. In addition, objects modified by "first" and "second" are generally of one type, and the quantities of objects are not limited. For example, a first object may refer to one or more in quantity. In addition, "and/or" in this specification and claims means at least one of the connected objects, and the character "/" generally means that the associated objects are in an "or" relationship.

It is worth noting that the technology described in the embodiments of this disclosure is not limited to the long term evolution (LTE)/LTE-Advanced (LTE-A) system. It can also be applied in other wireless communications systems such as code division multiple access (CDMA), time division multiple access (TDMA), frequency division multiple access (FDMA), orthogonal frequency division multiple access (OFDMA), single-carrier frequency-division multiple access (SC-FDMA) and other systems. The terms "system" and "network" in the embodiments of this disclosure are often used interchangeably, and the described technology can be used in not only the above-mentioned systems and radio technologies but also other systems and radio technologies. However, a new radio (NR) system is described as an example below, and NR-related terminology is used in most of the following descriptions. The technology may also be used for applications other than the NR application, for example, in 6-th generation (6G) communications systems.

Figure 1:
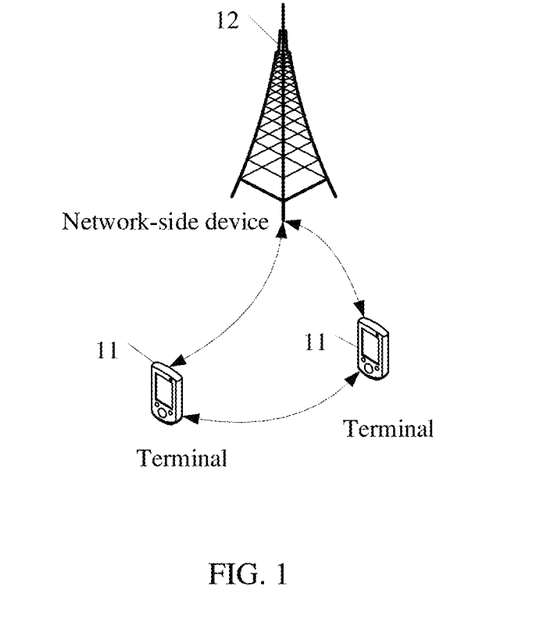
FIG. 1 is a block diagram of a wireless communications system according to an embodiment of this disclosure.

FIG. 1 is a block diagram of a wireless communications system to which the embodiments of this disclosure are applicable. The wireless communications system includes a terminal 11 and a network-side device 12. The terminal 11 may also be referred to as a terminal device or user equipment (UE). The terminal 11 may a terminal side device such as a cell phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable devices include bracelets, headphones, glasses, and the like. It should be noted that the terminal 11 is not limited to any particular type in the embodiments of this disclosure. The network-side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a next-generation NodeB (gNB), a home NodeB, a home evolved NodeB, a WLAN access point, a Wi-Fi node, a transmission and reception point (TRP) or other appropriate terms in the art. Provided that the same technical effects are achieved, the base station is not limited to any particular technical term. It should be noted that in the embodiments of this disclosure, only a base station in the NR system is used as an example, but the base station is not limited in type.

For a scenario in which a terminal in non-connected mode performs small data transmission (for example, transmission of user plane data), a network side may have configured, all for the terminal, a regular random access resource, a small data transmission resource based on random access, and a small data transmission resource based on configured grant. In this case, the terminal can perform small data transmission by using a small data transmission type based on configured grant, or perform small data transmission by using a small data transmission type based on random access.

However, it is not defined in the related technology how the terminal sets a data transmission type, tending to cause transmission problems due to inconsistent understanding between the terminal and the network side. Therefore, how the terminal sets the small data transmission type is an urgent problem to be solved.

The method for setting a data transmission type and the terminal that are provided by the embodiments of this disclosure will be described in detail below through some embodiments and disclosure scenarios with reference to the accompanying drawings.

Figure 2:
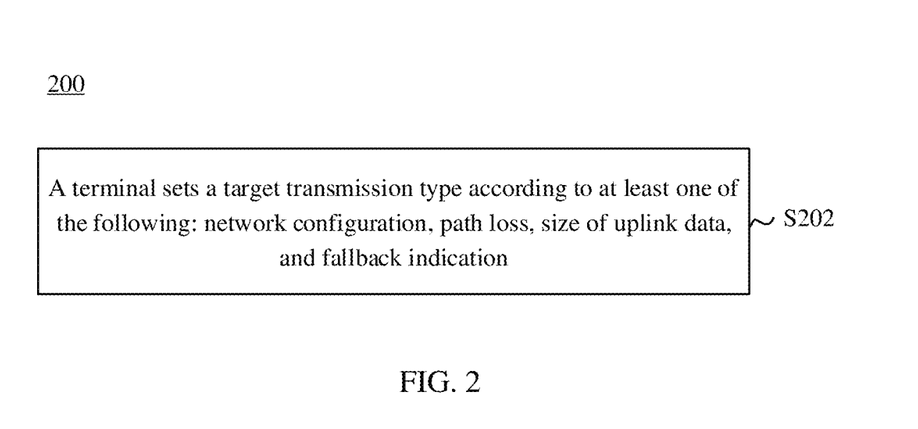
FIG. 2 is a schematic flowchart of a method for setting a data transmission type according to an embodiment of this disclosure.

As shown in FIG. 2, an embodiment of this disclosure provides a method 200 for setting a data transmission type. The method may be performed by a terminal. In other words, the method may be performed by software or hardware installed on the terminal. The method includes the following steps.

S202: The terminal sets a target transmission type according to at least one of the following: network configuration, path loss, size of uplink data, or fallback indication.

The target transmission type includes one of a small data transmission type based on configured grant, a small data transmission type based on random access, and a random access type.

Optionally, in this embodiment, the terminal is in non-connected mode before setting the target transmission type, and the non-connected mode includes an idle (IDLE) mode or an inactive (INACTIVE) mode.

The network configuration may be a transmission resource configured by a network, and the transmission resource may include at least one of the following: a small data transmission resource based on configured grant, a small data transmission resource based on four-step random access, a small data transmission resource based on two-step random access, a resource based on four-step random access, or a resource based on two-step random access.

The terminal may determine the path loss by using a measured value of a downlink reference signal.

The size of uplink data may be a size of a small data packet to be transmitted, for example, a size of available uplink user data; or may be a size of a finally generated medium access control protocol data unit (MAC PDU) including uplink user data, for example, the size of available uplink user data or the size of available uplink user data plus at least one of the following packet headers: service data adaptation protocol (SDAP) packet header, packet data convergence protocol (PDCP) packet header, radio link control (RLC) packet header, or medium access control (MAC) packet header; or further plus the size of at least one required media access control-control element (MAC CE): buffer status report (BSR) or power headroom report (PHR).

The fallback indication may be used to indicate that an uplink data transmission process, by the terminal, of the small data transmission type based on the random access has been ended or canceled.

In one example of S202, a small data transmission resource based on the configured grant has been configured for the terminal, and the small data transmission resource based on the configured grant is valid, and then the target transmission type is set to the small data transmission type based on the configured grant; or no small data transmission resource based on the configured grant and no small data transmission resource based on the random access have been configured for the terminal, and then the target transmission type is set to the random access type.

For another example, a measured value to which downlink path loss of the terminal refers is greater than a first channel quality threshold, and the target transmission type is set to the small data transmission type based on the configured grant; or the measured value to which downlink path loss of the terminal refers is greater than a second channel quality threshold, and the target transmission type is set to the small data transmission type based on the random access.

The measured value to which downlink path loss refers in this embodiment may include but is not limited to at least one of the following: reference signal received power (RSRP), reference signal received quality (RSRQ), signal-to-noise ratio (SINR), channel occupancy rate (CO), received signal strength indication (RSSI), or channel busy ratio (CBR).

For another example, the size of uplink data is less than or equal to a first transport block size (TBS) threshold, and the terminal sets the target transmission type to the small data transmission type based on the configured grant; or the size of uplink data is less than or equal to a second TBS threshold, and the terminal sets the target transmission type to the small data transmission type based on the random access.

For another example, an upper layer of the terminal has received no fallback indication from a lower layer, and sets the target transmission type to the small data transmission type based on the random access.

It should be noted that the lower layers mentioned in embodiments of this specification may be a media access control (MAC) layer or a physical layer, and the upper layers (higher layer/upper layer) mentioned in the embodiments of this specification may be a radio resource control (RRC) layer or an RRC sublayer.

The foregoing examples are provided for the terminal setting the target transmission type according to one of the following: network configuration, path loss, size of uplink data, and fallback indication. In actual application, the terminal may set the target transmission type according to at least two of the foregoing information.

For example, a small data transmission resource based on the configured grant has been configured for the terminal, and the measured value to which downlink path loss refers is greater than the first channel quality threshold, and then the target transmission type is set to the small data transmission type based on the configured grant.

For another example, a small data transmission resource based on the random access has been configured for the terminal, the measured value to which downlink path loss refers is greater than the second channel quality threshold, and no fallback indication has been received, and then the target transmission type is set to the small data transmission type based on the random access.

For another example, a small data transmission resource based on the configured grant has been configured for the terminal, the measured value to which downlink path loss refers is greater than the first channel quality threshold, and the size of uplink data is less than or equal to the first TBS threshold, and then the target transmission type is set to the small data transmission type based on the configured grant.

For the small data transmission type based on the configured grant mentioned in the embodiments of this specification, for example, a network-side device may configure an uplink grant for the terminal using a radio resource control (RRC) release message, where the uplink grant includes parameters such as period and a time domain, frequency domain, code domain, or space domain parameter for physical uplink shared channel (PUSCH), that is, the small data transmission resource based on the configured grant as mentioned above.

After setting the target transmission type to the small data transmission type based on the configured grant, the terminal may further use the configured uplink grant to perform uplink data transmission, where the uplink grant may be UE-specific. In some embodiments, the terminal sends data radio bearer (DRB) data and/or a signaling radio bearer (SRB) request message (for example, RRC resume request message) on a UE-specific PUSCH resource. After sending the PUSCH, the terminal may further monitor physical downlink control channel (PDCCH) scrambled by a specified terminal identifier (for example, C-RNTI) of the terminal in a corresponding PDCCH monitoring occasion, for scheduling information corresponding to a physical downlink shared channel (PDSCH). The PDSCH includes DRB data of the terminal and/or an SRB response message (for example, RRC Release message).

The small data transmission type based on the random access mentioned in the embodiments of this specification may include a small data transmission type based on two-step random access or a small data transmission type based on four-step random access.

For the small data transmission type based on the random access mentioned in the embodiments of this specification, for example, the network-side device may configure, for the terminal using a broadcast message, uplink transmission resources including MsgA physical random access channel (PRACH) and MsgA PUSCH resources corresponding to the small data transmission type based on two-step random access, or Msg1 PRACH resource and Msg3 PUSCH parameters corresponding to the small data transmission type based on four-step random access, that is, the small data transmission resource based on the random access as mentioned above.

After setting the target transmission type to the small data transmission type based on the two-step random access, the terminal may further send the MsgA PRACH and MsgA PUSCH by selecting resources corresponding to the small data transmission type based on the two-step random access. In some embodiments, the terminal sends DRB data and/or an SRB request message (for example, an RRC resume request message) on the MsgA PUSCH. After sending the MsgA PRACH and/or MsgA PUSCH, the terminal may further monitor PDCCH scrambled by a specified terminal identifier (for example, MsgB-RNTI) in a corresponding PDCCH monitoring occasion, for scheduling information corresponding to a MsgB PDSCH. The MsgB PDSCH includes DRB data of the terminal and/or an SRB response message (for example, RRC Release message) and/or a contention resolution identity.

After setting the target transmission type to the small data transmission type based on the four-step random access, the terminal may further send a Msg1 PRACH by selecting a resource corresponding to the small data transmission type based on the four-step random access. In some embodiments, after sending the Msg1 PRACH, the terminal may further monitor PDCCH scrambled by a specified terminal identifier (for example, RA-RNTI) in a corresponding PDCCH monitoring occasion, for scheduling information corresponding to a Msg2 random access response (RAR). The Msg2 RAR includes an uplink grant for sending a Msg3 PUSCH. The terminal then sends DRB data and/or an SRB request message (for example, RRC resume request message) on the Msg3 PUSCH. After sending the Msg3 PUSCH, the terminal may further monitor PDCCH scrambled by a specified terminal identifier (for example, TC-RNTI) in a corresponding PDCCH monitoring occasion, for scheduling information corresponding to a Msg4 PDSCH. The Msg4 PDSCH includes DRB data of the terminal and/or an SRB response message (for example, RRC Release message) and/or a contention resolution identity.

For the random access type mentioned in the embodiments of this specification, for example, the network-side device may configure, for the terminal using a broadcast message, MsgA PRACH and MsgA PUSCH resources for two-step random access, or Msg1 PRACH resource and Msg3 PUSCH parameters for four-step random access. After setting the target transmission type to the random access type, the terminal can use the MsgA PUSCH or Msg3 PUSCH to only send the SRB response message but not to carry and send the DRB data, meaning user-plane uplink data transmission cannot be performed.

In practice, the foregoing small data transmission type based on the random access can be used for small data transmission (for example, DRB data transmission) or not for small data transmission (for example, no DRB data being carried). The foregoing small data transmission type based on the configured grant and the small data transmission type based on the random access type or random access type are generally used only for small data transmission.

In the embodiments of this disclosure, the terminal can set the target transmission type according to at least one of the following: network configuration, path loss, size of uplink data, or fallback indication. The target transmission type includes the small data transmission type based on the configured grant, the small data transmission type based on the random access, or the random access type. This resolves the problem in the related technology that a terminal is unable to set a data transmission type, facilitating a consistent understanding between the terminal and a network side, and improving performance of small data transmission.

Several some embodiments are provided to describe in detail the method for setting a data transmission type provided by the embodiments of this disclosure.

Embodiment 1

In this embodiment, the setting, by a terminal, a target transmission type according to at least one of the following includes: setting the target transmission type to a small data transmission type based on the configured grant according to at least one of the following:
  (1) A small data transmission resource based on the configured grant having been configured. For example, the network side has explicitly configured a small data transmission resource based on the configured grant for a bandwidth part (BWP). The small data transmission resource based on the configured grant is associated with a synchronization signal and PBCH block (SSB).
  (2) A small data transmission resource based on the configured grant being valid. The "valid" mentioned in this example can be understood as the configured small data transmission resource based on the configured grant being available. For example, being valid may be deemed when the network side has configured a small data transmission resource based on the configured grant, and/or a given timer (for example, a time alignment timer associated with the small data transmission type based on the configured grant) is running, and/or a small data transmission resource based on the configured grant is within an uplink slot (UL slot) and does not contend with any SSB. For another example, "valid" can also be understood as the terminal retaining without releasing the small data transmission resource based on the configured grant.
  (3) A measured value to which downlink path loss refers being greater than a first channel quality threshold. For example, a measured value of a downlink reference signal (DL RS) is greater than the first channel quality threshold.
  (4) Path loss is less than a first channel quality threshold.
  It should be noted that, generally, for the first channel quality thresholds mentioned in the two examples (3) and (4), only one of them is present in practical application. In other words, (3) and (4) are two mutually exclusive schemes, and usually are not present at the same time. Besides, the first channel quality thresholds in (3) and (4) may be unequal.
  (5) The size of uplink data being less than or equal to a first transport block size (Transport block size, TBS) threshold. In this example, how the terminal determines the size of uplink data may depend on the implementation of the terminal.

Optionally, in this embodiment, the setting the target transmission type to the small data transmission type based on the configured grant further includes: setting a small data transmission variable to true.

It should be noted that setting the small data transmission variable to true usually means that the terminal has set the small data transmission type based on the configured grant for uplink data transmission, or set the small data transmission type based on the random access for uplink data transmission. The small data transmission variable being set to false usually means that the terminal has not set either of the above two transmission types for uplink data transmission. Instead, the terminal initiates an RRC connection resume process by using a random access type, and performs uplink data transmission after an RRC connection is resumed.

In this embodiment, when both a small data transmission resource based on the random access (including a small data transmission resource based on the four-step random access and a small data transmission resource based on the two-step random access) and a small data transmission resource based on the configured grant have been configured for the terminal, the terminal can preferentially select the small data transmission type based on the configured grant for uplink data transmission so as to make full use of already allocated uplink resources.

Optionally, this embodiment further includes the following step: indicating, by an upper layer (for example, RRC layer) of the terminal, that a lower layer (for example, MAC layer or physical layer) performs an uplink data transmission process of the small data transmission type based on the configured grant, according to at least one of the following:
  (1) the target transmission type being set to the small data transmission type based on the configured grant; or
  (2) the small data transmission variable taking a value true, which can be realized by the operation of setting the small data transmission variable to true as in the foregoing example.

Embodiment 2

In this embodiment, the setting, by a terminal, a target transmission type according to at least one of the following includes: setting the target transmission type to a small data transmission type based on the random access according to at least one of the following:
  (1) A small data transmission resource based on random access having been configured. For example, under the condition that a small data transmission resource based on the random access has been configured for a BWP (for example, a small data transmission resource based on the four-step random access and/or a small data transmission resource based on the two-step random access has been configured for a BWP), the small data transmission type is set to the small data transmission type based on the random access, and optionally, a small data transmission variable is set to true.
  (2) A measured value to which downlink path loss refers being greater than a second channel quality threshold, for example, a measured value of a downlink PL RS being greater than the second channel quality threshold.
  (3) Path loss being less than a second channel quality threshold.
  It should be noted that, generally, for the second channel quality thresholds mentioned in the two examples of (3) and (4), only one of them is present in practical application. In other words, (3) and (4) are two mutually exclusive schemes, and usually are not present at the same time. Besides, the second channel quality thresholds in (3) and (4) may be unequal.
  (4) Size of uplink data being less than or equal to a second TBS threshold.
  (5) No fallback indication having been received from a lower layer, where the fallback indication is used to indicate that an uplink data transmission process of the small data transmission type based on the random access has been ended or canceled.

Optionally, in this embodiment, the setting the target transmission type to the small data transmission type based on the random access further includes: setting a small data transmission variable to true.

Optionally, this embodiment further includes the following step: indicating, by an upper layer of the terminal, that a lower layer performs an uplink data transmission process of the small data transmission type based on the random access, according to at least one of the following:
(1) the target transmission type being set to the small data transmission type based on the random access; or
(2) the small data transmission variable taking a value true, which can be realized by the operation of setting the small data transmission variable to true in the foregoing example.

Embodiment 3

In this embodiment, the setting, by a terminal, a target transmission type according to at least one of the following includes: setting the target transmission type to a random access type according to at least one of the following:
(1) no small data transmission resource based on the configured grant having been configured;
(2) no small data transmission resource based on the random access having been configured;
(3) a small data transmission resource based on the configured grant being invalid;
(4) a measured value to which downlink path loss refers being not greater than a first channel quality threshold;
(5) path loss being greater than a first channel quality threshold;
(6) a measured value to which downlink path loss refers being not greater than a second channel quality threshold;
(7) path loss being greater than a second channel quality threshold;
(8) size of uplink data being greater than a first TBS threshold;
(9) size of uplink data being greater than a second TBS threshold; or
(10) a fallback indication being received from a lower layer, where the fallback indication is used to indicate that an uplink data transmission process of the small data transmission type based on the random access has been ended or canceled.

Optionally, in this embodiment, the setting the target transmission type to the random access type includes: setting a small data transmission variable to false.

It should be noted that the three embodiments described above may also be combined to form other embodiments of this disclosure. For example, in a new combined embodiment, if the conditions (1) to (5) listed in Embodiment 1 are all met, the terminal sets the target transmission type to the small data transmission type based on the configured grant.

If at least one of the conditions (1) to (5) listed in Embodiment 1 is not met, and the conditions (1) to (5) listed in Embodiment 2 are all met, the terminal sets the target transmission type to the small data transmission type based on the random access.

If at least one of the conditions (1) to (5) listed in Embodiment 1 is not met, at least one of the conditions (1) to (5) listed in Embodiment 2 is not met, and at least one of the conditions (1) to (10) listed in Embodiment 3 is met, the terminal sets the target transmission type to the random access type.

Optionally, before the setting, by a terminal, a target transmission type according to at least one of the following as described in the foregoing embodiments, the method further includes: starting a first RRC connection resume process, where the first RRC connection resume process is used for performing uplink data transmission using the small data transmission type based on the configured grant or the small data transmission type based on the random access. In other words, after the terminal sets the target transmission type to the small data transmission type based on the configured grant, or sets the target transmission type to the small data transmission type based on the random access, the terminal can perform uplink data transmission via the first RRC connection resume process.

Optionally, the embodiment further includes: in a case that a second RRC connection resume process is requested when the first RRC connection resume process is in progress, and that the target transmission type is the small data transmission type based on the configured grant, continuing with the first RRC connection resume process; or starting the second RRC connection resume process. Optionally, the second RRC connection resume process may be used for the terminal to resume an RRC connection, so as to restore SRB 1. Optionally, the second RRC connection resume process may also be used for the terminal to establish an RRC connection, so as to change to RRC connected mode.

In the case of starting the second RRC connection resume process, the method further includes the following step: executing a small data transmission fallback process, where the small data transmission fallback process is used to end, cancel, or suspend an uplink data transmission process of the small data transmission type based on the configured grant. For detailed introduction of the small data transmission fallback process, refer to subsequent embodiments.

Based on the introduction of the foregoing several embodiments, in the case of setting the target transmission type to the small data transmission type based on the configured grant, the method further includes the following step: selecting an uplink carrier used for uplink data transmission of the small data transmission type based on the configured grant.

In some embodiments, the selecting an uplink carrier used for uplink data transmission of the small data transmission type based on the configured grant includes: in a first case, selecting supplementary uplink (SUL) as the uplink carrier used for uplink data transmission of the small data transmission type based on the configured grant; and in a second case, selecting normal uplink (NUL) as the uplink carrier used for uplink data transmission of the small data transmission type based on the configured grant.

The first case includes a measured value to which downlink path loss refers being lower than a third channel quality threshold, and the second case is a case other than the first case. For example, the second case is a case that the measured value to which downlink path loss refers is greater than or equal to the third channel quality threshold, or a case other than this.

Based on the introduction of the foregoing several embodiments, in the case of setting the target transmission type to the small data transmission type based on the configured grant, the method further includes at least one of the following:
(1) Transmitting, by a lower layer of the terminal, a failure indication to an upper layer according to expiry of a first timer. The first timer is configured for monitoring downlink control information after uplink data transmission of the small data transmission type based on the configured grant is performed; the failure indication is used to indicate that an uplink data transmission process of the small data transmission type based on the configured grant is unsuccessful. The uplink data transmission process being unsuccessful means, for example, no response message has been received from the network side within a period of time (for example, the first timer expires).

(2) Transmitting, by a lower layer of the terminal, an uplink skip indication to an upper layer according to no protocol data unit to be transmitted being obtained. The uplink skip indication is used to indicate that uplink skipping has occurred in an uplink data transmission process of the small data transmission type based on the configured grant.

(3) Setting a first transmission counter to a value 0. The first transmission counter is configured to count failures of the uplink data transmission process of the small data transmission type based on the configured grant.

(4) Incrementing the first transmission counter by 1 in a case that an upper layer of the terminal receives one failure indication from a lower layer.

(5) Executing a small data transmission fallback process in a case that the first transmission counter takes a value equal to a first count threshold.

(6) Setting a second transmission counter to a value 0. The second transmission counter is configured to count uplink skips in the uplink data transmission process of the small data transmission type based on the configured grant.

(7) Incrementing the second transmission counter by 1 in a case that an upper layer of the terminal receives one uplink skip indication from a lower layer.

(8) Executing a small data transmission fallback process in a case that the second transmission counter takes a value equal to a second count threshold.

It should be noted that one or more of (1) to (8) may be performed.

For example, the terminal first performs (3) of setting the first transmission counter to a value 0; then performs (1) of transmitting, by a lower layer of the terminal, a failure indication to an upper layer (for example, RRC layer) according to expiry of the first timer; then performs (4) of incrementing the first transmission counter by 1 in a case that an upper layer of the terminal receives one failure indication from a lower layer, and finally performs (5) of executing a small data transmission fallback process in a case that the first transmission counter takes a value equal to the first count threshold.

For another example, the terminal first performs (6) of setting the second transmission counter to a value 0; then performs (2) of transmitting, by a lower layer of the terminal, an uplink skip indication to an upper layer according to no protocol data unit to be transmitted being obtained; then performs (7) of incrementing the second transmission counter by 1 in a case that an upper layer of the terminal receives one uplink skip indication from a lower layer; and finally performs (8) of executing a small data transmission fallback process in a case that the second transmission counter takes a value equal to the second count threshold.

Based on the introduction of foregoing several embodiments, in the case of setting the target transmission type to the small data transmission type based on the random access, the method further includes: setting the target transmission type to a small data transmission type based on the two-step random access according to at least one of the following:
  (1) a measured value to which downlink path loss refers being greater than a fourth channel quality threshold;
  (2) a small data transmission resource based on the two-step random access having been configured; or
  (3) size of uplink data is less than or equal to a third TBS threshold.

Based on the introduction of foregoing several embodiments, in the case of setting the target transmission type to the small data transmission type based on the random access, the method further includes: setting the target transmission type to a small data transmission type based on the four-step random access according to at least one of the following:
  (1) a measured value to which downlink path loss refers being not greater than a fourth channel quality threshold;
  (2) a small data transmission resource based on the four-step random access having been configured; or
  (3) size of uplink data being greater than a third TBS threshold.

Optionally, in a case that the target transmission type is the small data transmission type based on the random access, the method further includes at least one of the following:
  (1) Setting the target transmission type to a small data transmission type based on the four-step random access according to at least one of the following: the target transmission type being set to the small data transmission type based on the two-step random access, or a preamble transmission counter (PREAMBLE_TRANSMISSION_COUNTER) taking a value equal to a third count threshold plus 1.
  (2) Transmitting, by a lower layer of the terminal, a fallback indication to an upper layer in a case that the preamble transmission counter takes a value equal to the third count threshold plus 1.

The third count threshold mentioned in the foregoing two examples indicates a maximum count of failures of small data transmission performed by the terminal by using the small data transmission type based on the two-step random access.

(3) Transmitting, by a lower layer of the terminal, a fallback indication to an upper layer in a case that the preamble transmission counter takes a value equal to a fourth count threshold plus 1.

The fourth count threshold indicates a maximum count of failures of small data transmission performed by the terminal by using a small data transmission type based on the four-step random access.

(4) Executing a small data transmission fallback process according to reception by an upper layer of the terminal a fallback indication from a lower layer.

Optionally, the small data transmission fallback process described in the foregoing embodiments includes at least one of the following:
  (1) Starting or restarting a second timer (for example, a timer 319, T319), where the second timer is configured to indicate a maximum duration for the terminal to perform an RRC connection resume process.
  (2) Starting sending an RRC resume request message.
  (3) Setting a small data transmission variable to false.
  (4) Releasing a small data transmission resource based on the configured grant.
  (5) Discarding a stored small data transmission resource based on the configured grant.

The starting sending an RRC resume request message in (2) includes, for example: generating, by an upper layer, an RRC resume request message, and transmitting the RRC resume request message to a lower layer. When the target transmission type is the small data transmission type based on the random access, the lower layer executes a random access initialization process (for example, clearing an Msg3/MsgA buffer) so as to perform an RRC resume process via a random access process. For another example, an upper layer generates an RRC resume request message and transmits the RRC resume request message to a lower layer. When the target transmission type is the small data transmission type based on the configured grant, the lower layer clears a HARQ buffer associated with the configured grant, and executes a random access initialization process, so as to perform an RRC resume process via a random access process.

In the case of (4) and (5), the executing a small data transmission fallback process further includes: in a case that the first transmission counter takes a value equal to a first count threshold, releasing the small data transmission resource based on the configured grant, or discarding the stored small data transmission resource based on the configured grant; or in a case that the first transmission counter takes a value equal to the first count threshold, releasing the small data transmission resource based on the configured grant, and discarding the stored small data transmission resource based on the configured grant.

In the case of (4) and (5), the executing a small data transmission fallback process further includes: in a case that the second transmission counter takes a value equal to a second count threshold, releasing the small data transmission resource based on the configured grant, or discarding the stored small data transmission resource based on the configured grant; or in a case that the second transmission counter takes a value equal to the second count threshold, releasing the small data transmission resource based on the configured grant, and discarding the stored small data transmission resource based on the configured grant.

In the foregoing embodiments, before the setting, by a terminal, a target transmission type according to at least one of the following, the method further includes: receiving configuration information, where the configuration information is used for configuring at least one of the following for the terminal:
(1) A small data transmission resource based on the configured grant. For example, the network side configures, via an RRC release message, a small data transmission resource based on the configured grant for a terminal that has switched from connected (CONNECTED) mode to inactive mode, where the resource includes a UE-specific PUSCH resource used for the inactive terminal to perform small data transmission.
(2) A small data transmission resource based on the four-step random access. For example, the network side configures, via a system broadcast SIB 1 message, a small data transmission resource based on the four-step random access for an inactive terminal, where the resource includes a physical random access channel (Physical Random Access Channel, PRACH) resource used for the inactive terminal to perform small data transmission.
(3) A small data transmission resource based on the two-step random access. For example, the network side configures, via a system broadcast SIB 1 message, a small data transmission resource based on the two-step random access for an inactive terminal, where the resource includes a PRACH resource and a PUSCH resource used for the inactive terminal to perform small data transmission.

Optionally, the configuration information is further used for configuring at least one of the following for the terminal:
(1) A first channel quality threshold, where the first channel quality threshold is for the terminal to set the target transmission type to the small data transmission type based on the configured grant.

Based on the first channel quality threshold, the terminal can set the small data transmission type to the small data transmission type based on the configured grant. The first channel quality threshold includes but is not limited to a signal-to-noise ratio (SINR), a reference signal received power (RSRP), reference signal received quality (RSRQ), and other indicators that characterize channel quality. Optionally, the first channel quality threshold is configured only when the network side has configured the small data transmission resource based on the configured grant for a BWP (for example, initial BWP).
(2) A second channel quality threshold, where the second channel quality threshold is for the terminal to set the target transmission type to the small data transmission type based on the random access (four-step random access or two-step random access).

Optionally, the second channel quality threshold is configured only when the network side has configured the small data transmission resource based on the four-step random access or the small data transmission resource based on the two-step random access for a BWP (for example, initial BWP).
(3) A third channel quality threshold, where the third channel quality threshold is for the terminal to select SUL as an uplink carrier used for uplink data transmission of the small data transmission type based on the configured grant.
(4) A fourth channel quality threshold, where the fourth channel quality threshold is for the terminal to set the target transmission type to a small data transmission type based on the two-step random access.

Optionally, the fourth channel quality threshold is configured only when the network side has configured the small data transmission resource based on the four-step random access and the small data transmission resource based on the two-step random access for a BWP (for example, initial BWP).
(5) A first TBS threshold, where the first TBS threshold indicates a maximum TBS corresponding to the terminal performing small data transmission using the small data transmission type based on the configured grant.

The first TBS threshold may indicate a maximum TBS where it is appropriate for the terminal to perform small data transmission (or uplink data transmission) using the small data transmission type based on the configured grant.

Optionally, the first TBS threshold is configured only when the network side has configured the small data transmission resource based on the configured grant for a BWP (for example, initial BWP).
(6) A second TBS threshold, where the second TBS threshold indicates a maximum TBS corresponding to the terminal performing small data transmission using the small data transmission type based on the random access.

The second TBS threshold may indicate a maximum TBS where it is appropriate for the terminal to perform small data transmission (or uplink data transmission) using the small data transmission type based on the random access.

Optionally, the first TBS threshold is configured only when the network side has configured the small data transmission resource based on the four-step random access or the small data transmission resource based on the two-step random access for a BWP (for example, initial BWP).

(7) A third TBS threshold, where the third TBS threshold indicates a maximum TBS corresponding to the terminal performing small data transmission using the small data transmission type based on the two-step random access.

The third TBS threshold indicates a maximum TBS where it is appropriate for the terminal to perform small data transmission (or uplink data transmission) using the small data transmission type based on the two-step random access.

(8) A first count threshold, where the first count threshold indicates a maximum count of failures of an uplink data transmission process performed by the terminal by using the small data transmission type based on the configured grant.

(9) A second count threshold, where the second count threshold indicates a maximum count of uplink skips in an uplink data transmission process performed by the terminal by using the small data transmission type based on the configured grant.

(10) A third count threshold, where the third count threshold indicates a maximum count of failures of small data transmission performed by the terminal by using the small data transmission type based on the two-step random access.

(11) A fourth count threshold, where the fourth count threshold indicates a maximum count of failures of small data transmission performed by the terminal by using a small data transmission type based on the four-step random access.

It should be noted that, the method for setting a data transmission type provided in the embodiments of this disclosure may be executed by a terminal, or a control module for executing the method for setting a data transmission type in the terminal. In the embodiments of this disclosure, the method for setting a data transmission type being executed by a terminal is used as an example for describing the terminal provided in the embodiments of this disclosure.

Figure 3:
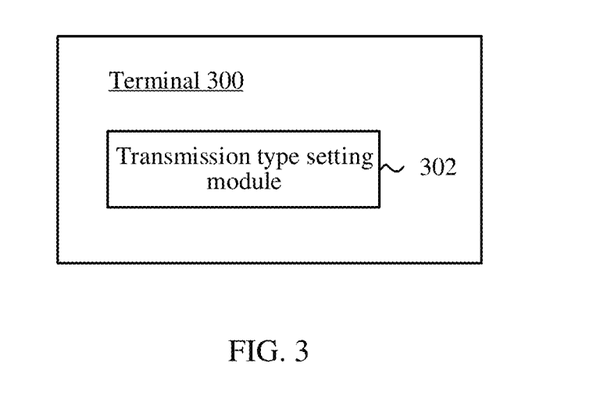
FIG. 3 is a schematic structural diagram of a terminal according to an embodiment of this disclosure.

FIG. 3 is a schematic structural diagram of a terminal according to an embodiment of this disclosure. As shown in FIG. 3, the terminal 300 includes a transmission type setting module 302, configured to set a target transmission type according to at least one of the following: network configuration, path loss, size of uplink data, or fallback indication, where the target transmission type includes one of a small data transmission type based on the configured grant, a small data transmission type based on the random access, and a random access type.

In this embodiment of this disclosure, the terminal can set the target transmission type according to at least one of the following: network configuration, path loss, size of uplink data, or fallback indication. The target transmission type includes the small data transmission type based on the configured grant, the small data transmission type based on the random access, or the random access type. This resolves the problem in the related technology that a terminal is unable to set a data transmission type, facilitating a consistent understanding between the terminal and a network side, and improving performance of small data transmission.

Optionally, in an embodiment, the transmission type setting module 302 may be configured to: set the target transmission type to the small data transmission type based on the configured grant according to at least one of the following: a small data transmission resource based on the configured grant having been configured; a small data transmission resource based on the configured grant being valid; a measured value to which downlink path loss refers being greater than a first channel quality threshold; path loss being less than the first channel quality threshold; or size of uplink data being less than or equal to a first TBS threshold.

Optionally, in an embodiment, the transmission type setting module 302 may further be configured to set a small data transmission variable to true.

Optionally, in an embodiment, the transmission type setting module 302 may further be configured to: indicate that a lower layer performs an uplink data transmission process of the small data transmission type based on the configured grant, according to at least one of the following: the target transmission type being set to the small data transmission type based on the configured grant; or the small data transmission variable taking a value true.

Optionally, in an embodiment, the transmission type setting module 302 may be configured to: set the target transmission type to the small data transmission type based on the random access according to at least one of the following: a small data transmission resource based on the random access having been configured; a measured value to which downlink path loss refers being greater than a second channel quality threshold; path loss being less than the second channel quality threshold; size of uplink data being less than or equal to a second TBS threshold; or no fallback indication having been received from a lower layer, where the fallback indication is used to indicate that an uplink data transmission process of the small data transmission type based on the random access has been ended or canceled.

Optionally, in an embodiment, the transmission type setting module 302 may further be configured to set a small data transmission variable to true.

Optionally, in an embodiment, the transmission type setting module 302 may also be configured to: indicate that a lower layer performs an uplink data transmission process of the small data transmission type based on the random access, according to at least one of the following: the target transmission type being set to the small data transmission type based on the random access; or the small data transmission variable taking a value true.

Optionally, in an embodiment, the transmission type setting module 302 may be configured to: set the target transmission type to the random access type according to at least one of the following: no small data transmission resource based on the configured grant having been configured; no small data transmission resource based on the random access having been configured; a small data transmission resource based on the configured grant being invalid; a measured value to which downlink path loss refers being not greater than a first channel quality threshold; path loss being greater than the first channel quality threshold; a measured value to which downlink path loss refers being not greater than a second channel quality threshold; path loss being greater than the second channel quality threshold; size of uplink data being greater than a first TBS threshold; size of uplink data being greater than a second TBS threshold; or a fallback indication being received from a lower layer, where the fallback indication is used to indicate that an uplink data transmission process of the small data transmission type based on the random access has been ended or canceled.

Optionally, in an embodiment, the transmission type setting module 302 may further be configured to set a small data transmission variable to false.

Optionally, in an embodiment, the terminal 300 further includes a starting module, configured to start a first RRC connection resume process, where the first RRC connection resume process is used for performing uplink data transmission using the small data transmission type based on the configured grant or the small data transmission type based on the random access.

Optionally, in an embodiment, the starting module may further be configured to: in a case that a second RRC connection resume process is requested when the first RRC connection resume process is in progress, and that the target transmission type is the small data transmission type based on the configured grant, continue with the first RRC connection resume process; or start the second RRC connection resume process.

Optionally, in an embodiment, in the case of starting the second RRC connection resume process, the transmission type setting module 302 is further configured to: execute a small data transmission fallback process, where the small data transmission fallback process is used to end, cancel, or suspend an uplink data transmission process of the small data transmission type based on the configured grant.

Optionally, in an embodiment, in a case that the target transmission type is the small data transmission type based on the configured grant, the transmission type setting module 302 is further configured to: select an uplink carrier used for uplink data transmission of the small data transmission type based on the configured grant.

Optionally, in an embodiment, the selecting an uplink carrier used for uplink data transmission of the small data transmission type based on the configured grant includes: in a first case, selecting supplementary uplink SUL as the uplink carrier used for uplink data transmission of the small data transmission type based on the configured grant; and in a second case, selecting normal uplink NUL as the uplink carrier used for uplink data transmission of the small data transmission type based on the configured grant. The first case includes a measured value to which downlink path loss refers being lower than a third channel quality threshold, and the second case is a case other than the first case.

Optionally, in an embodiment, in a case that the target transmission type is the small data transmission type based on the configured grant, the transmission type setting module 302 is further configured to perform at least one of the following: transmitting, by a lower layer of the terminal, a failure indication to an upper layer according to expiry of a first timer; transmitting, by a lower layer of the terminal, an uplink skip indication to an upper layer according to no protocol data unit to be transmitted being obtained; setting a first transmission counter to a value 0; incrementing the first transmission counter by 1 in a case that an upper layer of the terminal receives one failure indication from a lower layer; executing a small data transmission fallback process in a case that the first transmission counter takes a value equal to a first count threshold; setting a second transmission counter to a value 0; incrementing the second transmission counter by 1 in a case that an upper layer of the terminal receives one uplink skip indication from a lower layer; or executing a small data transmission fallback process in a case that the second transmission counter takes a value equal to a second count threshold; where the first timer is configured to monitor downlink control information after uplink data transmission of the small data transmission type based on the configured grant is performed; the failure indication is used to indicate that an uplink data transmission process of the small data transmission type based on the configured grant is unsuccessful; the uplink skip indication is used to indicate that uplink skipping has occurred in an uplink data transmission process of the small data transmission type based on the configured grant; the first transmission counter is configured to count failures of the uplink data transmission process of the small data transmission type based on the configured grant; and the second transmission counter is configured to count uplink skips in the uplink data transmission process of the small data transmission type based on the configured grant.

Optionally, in an embodiment, in a case that the target transmission type is the small data transmission type based on the random access, the transmission type setting module 302 is further configured to: set the target transmission type to a small data transmission type based on the two-step random access according to at least one of the following: a measured value to which downlink path loss refers being greater than a fourth channel quality threshold; a small data transmission resource based on the two-step random access having been configured; or size of uplink data being less than or equal to a third TBS threshold.

Optionally, in an embodiment, in a case that the target transmission type is the small data transmission type based on the random access, the transmission type setting module 302 is further configured to: set the target transmission type to a small data transmission type based on the four-step random access according to at least one of the following: a measured value to which downlink path loss refers being not greater than a fourth channel quality threshold; a small data transmission resource based on the four-step random access having been configured; or size of uplink data being greater than a third TBS threshold.

Optionally, in an embodiment, in a case that the target transmission type is the small data transmission type based on the random access, the transmission type setting module 302 is further configured to perform at least one of the following:

(1) setting the target transmission type to a small data transmission type based on the four-step random access according to at least one of the following: the target transmission type being set to the small data transmission type based on the two-step random access, or a preamble transmission counter taking a value equal to a third count threshold plus 1;

(2) transmitting, by a lower layer of the terminal, a fallback indication to an upper layer in a case that the preamble transmission counter takes a value equal to the third count threshold plus 1;

(3) transmitting, by a lower layer of the terminal, a fallback indication to an upper layer in a case that the preamble transmission counter takes a value equal to a fourth count threshold plus 1, or (4) executing a small data transmission fallback process according to reception by an upper layer of the terminal a fallback indication from a lower layer.

Optionally, in an embodiment, the executing a small data transmission fallback process includes at least one of the following: starting or restarting a second timer, where the second timer is configured to indicate a maximum duration for the terminal to perform an RRC connection resume process; starting sending an RRC resume request message; setting a small data transmission variable to false; releasing a small data transmission resource based on the configured grant; or discarding a stored small data transmission resource based on the configured grant.

Optionally, in an embodiment, the executing a small data transmission fallback process further includes: in a case that the first transmission counter takes a value equal to a first count threshold, releasing the small data transmission resource based on the configured grant, or discarding the stored small data transmission resource based on the configured grant; or in a case that the first transmission counter takes a value equal to the first count threshold, releasing the small data transmission resource based on the configured grant, and discarding the stored small data transmission resource based on the configured grant.

Optionally, in an embodiment, the executing a small data transmission fallback process further includes: in a case that the second transmission counter takes a value equal to a second count threshold, releasing the small data transmission resource based on the configured grant, or discarding the stored small data transmission resource based on the configured grant; or in a case that the second transmission counter takes a value equal to the second count threshold, releasing the small data transmission resource based on the configured grant, and discarding the stored small data transmission resource based on the configured grant.

Optionally, in an embodiment, the terminal 300 further includes a receiving module, configured to receive configuration information, where the configuration information is used for configuring at least one of the following for the terminal:
- a small data transmission resource based on the configured grant;
- a small data transmission resource based on the four-step random access; or
- a small data transmission resource based on the two-step random access.

Optionally, in an embodiment, the configuration information is also used for configuring at least one of the following for the terminal:

(1) a first channel quality threshold, where the first channel quality threshold is for the terminal to set the target transmission type to the small data transmission type based on the configured grant;

(2) a second channel quality threshold, where the second channel quality threshold is for the terminal to set the target transmission type to the small data transmission type based on the random access;

(3) a third channel quality threshold, where the third channel quality threshold is for the terminal to select SUL as an uplink carrier used for uplink data transmission of the small data transmission type based on the configured grant;

(4) a fourth channel quality threshold, where the fourth channel quality threshold is for the terminal to set the target transmission type to a small data transmission type based on the two-step random access;

(5) a first TBS threshold, where the first TBS threshold indicates a maximum TBS corresponding to the terminal performing small data transmission using the small data transmission type based on the configured grant;

(6) a second TBS threshold, where the second TBS threshold indicates a maximum TBS corresponding to the terminal performing small data transmission using the small data transmission type based on the random access;

(7) a third TBS threshold, where the third TBS threshold indicates a maximum TBS corresponding to the terminal performing small data transmission using the small data transmission type based on the two-step random access;

(8) a first count threshold, where the first count threshold indicates a maximum count of failures of an uplink data transmission process performed by the terminal by using the small data transmission type based on the configured grant;

(9) a second count threshold, where the second count threshold indicates a maximum count of uplink skips in an uplink data transmission process performed by the terminal by using the small data transmission type based on the configured grant;

(10) a third count threshold, where the third count threshold indicates a maximum count of failures of small data transmission performed by the terminal by using the small data transmission type based on the two-step random access; or (11) a fourth count threshold, where the fourth count threshold indicates a maximum count of failures of small data transmission performed by the terminal by using a small data transmission type based on the four-step random access.

For details of the terminal 300 in the embodiments of this disclosure, reference may be made to the process corresponding to the method 200 in the embodiments of this disclosure. In addition, the units/modules of the terminal 300 and the other operations and/or functions described above are used to implement corresponding processes of the method 200, with the same or equivalent technical effects achieved. For brevity, details are not described herein again.

The terminal in the embodiments of this disclosure may alternatively be a component, an integrated circuit, or a chip in a terminal. The terminal may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), an automated teller machine, a self-service machine, or the like. This is not specifically limited in this embodiment of this disclosure.

The terminal in the embodiments of this disclosure may be an apparatus with an operating system. The operating system may be an Android operating system, an iOS operating system, or other possible operating systems. This is not specifically limited in this embodiment of this disclosure.

The terminal provided by the embodiments of this disclosure can realize the processes realized in the method embodiment of FIG. 2 with the same technical effects achieved. To avoid repetition, details are not described herein again.

Figure 4:
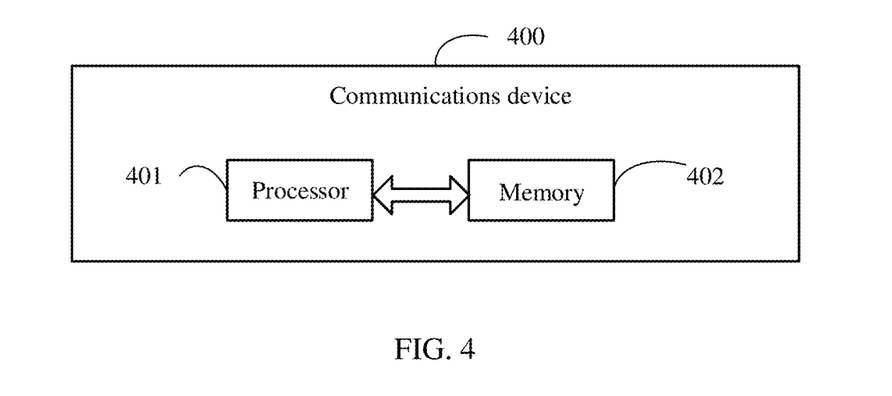
FIG. 4 is a schematic structural diagram of a communications device according to an embodiment of this disclosure.

Optionally, as shown in FIG. 4, an embodiment of this disclosure further provides a communications device 400, including a processor 401, a memory 402, and a program or instructions stored in the memory 402 and executable on the processor 401. For example, in a case that the communications device 400 is a terminal, when the program or instructions are executed by the processor 401, the processes in the embodiment of the method for setting a data transmission type are implemented, with the same technical effects achieved.

Figure 5:
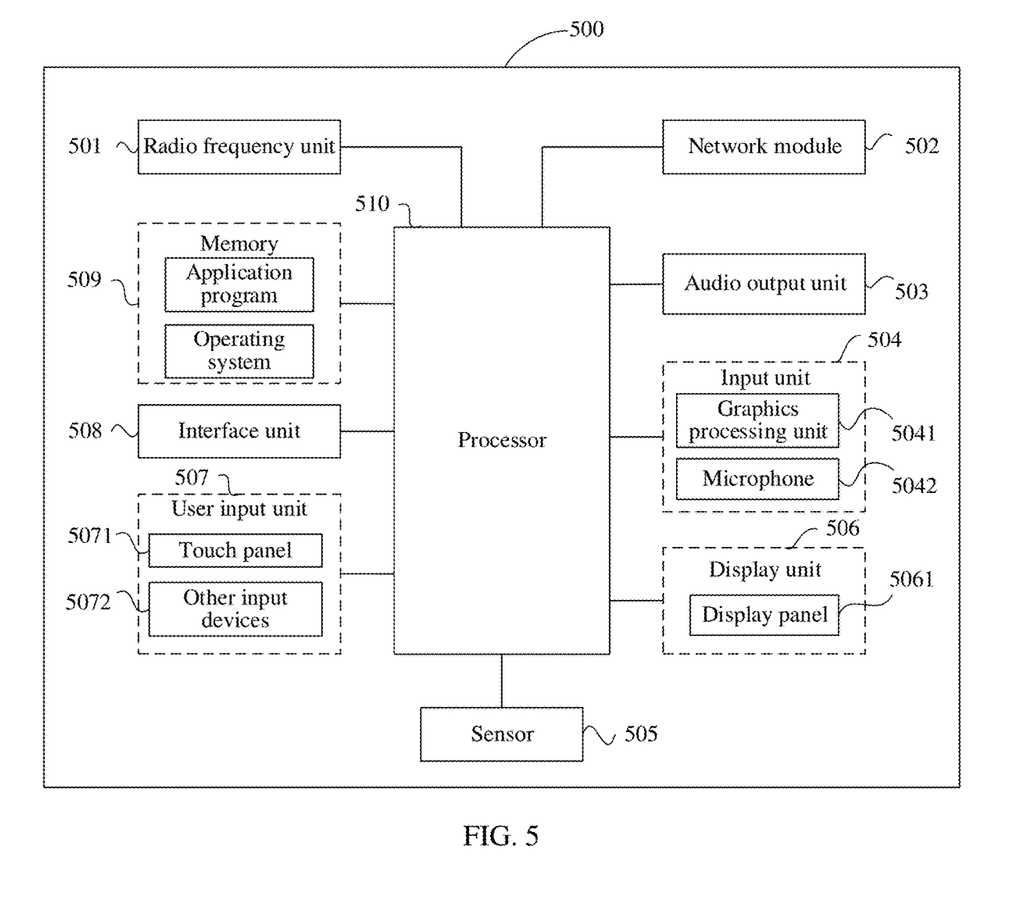
FIG. 5 is a schematic structural diagram of a terminal according to an embodiment of this disclosure.

FIG. 5 is a schematic diagram of a hardware structure of a terminal according to an embodiment of this disclosure.

The terminal 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

Persons skilled in the art can understand that the terminal 500 may further include a power supply (for example, a battery) for supplying power to the components, and the power supply may be logically connected to the processor 510 via a power management system, so that functions such as charging and discharging management and power consumption management are implemented via the power management system. The terminal structure shown in FIG. 5 does not constitute any limitation on the terminal, and the terminal may include more or fewer components than shown in the figure, or combine some of components or have different arrangement of the components. Details are not described herein.

It should be understood that, in this embodiment of this disclosure, the input unit 504 may include a graphics processing unit (GPU) 5041 and a microphone 5042. The graphics processing unit 5041 processes image data of a static image or a video obtained by an image capturing apparatus (for example, a camera) in an image capture mode or a video capture mode. The display unit 506 may include a display panel 5061, and the display panel 5061 may be configured in the form of a liquid crystal display, an organic light-emitting diode display, or the like. The user input unit 507 includes a touch panel 5071 and other input devices 5072. The touch panel 5071 is also referred to as a touchscreen. The touch panel 5071 may include two parts: a touch detection apparatus and a touch controller. The other input devices 5072 may include but are not limited to a physical keyboard, a functional button (such as a volume control button or a power on/off button), a trackball, a mouse, and a joystick. Details are not described herein.

In this embodiment of this disclosure, the radio frequency unit 501 receives downlink data from a network-side device, and transmits the downlink data to the processor 510 for processing; and transmits uplink data to the network-side device. Usually, the radio frequency unit 501 includes but is not limited to an antenna, at least one amplifier, a transceiver, a coupler, a low noise amplifier, and a duplexer.

The memory 509 may be configured to store a software program or instructions and various data. The memory 509 may mainly include a program or instruction storage area and a data storage area, where the program or instruction storage area may store an operating system, an disclosure program or instructions required by at least one function (such as a sound play function or an image play function), and the like. In addition, the memory 509 may include a high-speed random access memory, and may also include a non-volatile memory, where the non-volatile memory may be a read-only memory (ROM), a programmable read-only memory (PROM), an erasable programmable read-only memory (EPROM), an electrically erasable programmable read-only memory (EEPROM), or a flash memory. For example, the non-volatile memory may be at least one magnetic disk storage device, flash storage device, or other non-volatile solid-state storage devices.

The processor 510 may include one or more processing units. Optionally, the processor 510 may integrate an application processor and a modem processor, where the application processor mainly processes an operating system, a user interface, an application program or instructions, or the like, and the modem processor mainly processes wireless communications, for example, a baseband processor. It should be understood that alternatively, the modem processor may not be integrated into the processor 510.

The processor 510 is configured to set a target transmission type according to at least one of the following: network configuration, path loss, size of uplink data, or fallback indication, where the target transmission type includes one of a small data transmission type based on the configured grant, a small data transmission type based on the random access, and a random access type.

In this embodiment of this disclosure, the terminal can set the target transmission type according to at least one of the following: network configuration, path loss, size of uplink data, or fallback indication. The target transmission type includes the small data transmission type based on the configured grant, the small data transmission type based on the random access, or the random access type. This resolves the problem in the related technology that a terminal is unable to set a data transmission type, facilitating a consistent understanding between the terminal and a network side, and improving performance of small data transmission.

The terminal provided in this embodiment of this disclosure can also implement the processes in foregoing embodiment of the method for setting a data transmission type, with the same technical effects achieved. To avoid repetition, details are not described herein again.

An embodiment of this disclosure further provides a non-transitory readable storage medium, where the non-transitory readable storage medium stores a program or instructions. When the program or instructions are executed by a processor, the processes in foregoing embodiment of the method for setting a data transmission type are implemented, with the same technical effects achieved. To avoid repetition, details are not described herein again.

The processor may be a processor in the terminal described in the foregoing embodiments. The non-transitory readable storage medium includes a non-transitory computer-readable storage medium, for example, a computer read-only memory (ROM), a random access memory (RAM), a magnetic disk, an optical disc, or the like.

An embodiment of this disclosure further provides a chip, where the chip includes a processor and a communications interface, and the communications interface is coupled to the processor. The processor is configured to execute a program or instructions to implement the processes of the method for setting a data transmission type in the foregoing embodiment, with the same technical effects achieved. To avoid repetition, details are not described herein again.

It should be understood that the chip mentioned in this embodiment of this disclosure may also be referred to as a system-on-a-chip.

An embodiment of this disclosure further provides a computer program product, where the computer program product is stored in a non-volatile memory, and the computer program product is executed by at least one processor to implement the processes in foregoing embodiment of the method for setting a data transmission type, with the same technical effects achieved. To avoid repetition, details are not described herein again.

An embodiment of this disclosure further provides a communications device, which is configured to execute the processes in the foregoing embodiment of the method for setting a data transmission type, with the same technical effects achieved. To avoid repetition, details are not described herein again.

It should be noted that, in this specification, the terms "include", "comprise", or any of their variants are intended to cover a non-exclusive inclusion, such that a process, method, article, or apparatus that includes a series of elements not only includes those elements but also includes other elements that are not expressly listed, or further includes elements inherent to such process, method, article, or apparatus. In absence of more constraints, an element preceded by "includes a . . . " does not exclude the presence of other identical elements in the process, method, article, or apparatus that includes the element. In addition, it should be pointed out that the scope of the method and apparatus in the embodiments of this disclosure is not limited to performing functions in the order shown or discussed, but may also include performing functions substantially concurrently or in the reverse order depending on the functions involved. For example, the described method may be performed in an order different from the order described, and various steps may be added, omitted, or combined. In addition, features described with reference to some examples may be combined in other examples.

From the foregoing descriptions of the implementations, persons skilled in the art can clearly understand that the method in the foregoing embodiments may be implemented by software plus a necessary general hardware platform. Certainly, the method in the foregoing embodiments may alternatively be implemented by hardware. However, in many cases, the former is a preferred implementation. Based on such an understanding, the technical solutions of this disclosure essentially or the part contributing to the prior art may be implemented in the form of a software product. The computer software product is stored in a non-transitory storage medium (such as a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure have been described above with reference to the accompanying drawings, but this disclosure is not limited to the foregoing implementations. These implementations are merely illustrative rather than restrictive. Under the enlightenment of this disclosure, persons of ordinary skills in the art may make many forms without departing from the essence of this disclosure and the scope of protection of claims, all of which fall within the protection of this disclosure.

What is claimed is:

1. A method for setting a data transmission type, wherein the method comprises:
    setting, by a terminal, a target transmission type according to at least one of following: network configuration, path loss, size of uplink data, or fallback indication, wherein the target transmission type comprises one of a small data transmission type based on configured grant, a small data transmission type based on random access, and a random access type; wherein
    in a case that the target transmission type is the small data transmission type based on random access, the method further comprises:
    setting the target transmission type to a small data transmission type based on two-step random access according to at least one of: a measured value to which downlink path loss refers being greater than a fourth channel quality threshold; or a small data transmission resource based on two-step random access having been configured;
    or,
    setting the target transmission type to a small data transmission type based on four-step random access according to at least one of: a measured value to which downlink path loss refers being not greater than the fourth channel quality threshold; or a small data transmission resource based on four-step random access having been configured.

2. The method according to claim 1, wherein the setting, by the terminal, the target transmission type according to at least one of the following comprises: setting the target transmission type to the small data transmission type based on the configured grant according to at least one of following:
    a small data transmission resource based on the configured grant having been configured;
    a small data transmission resource based on the configured grant being valid;
    a measured value to which downlink path loss refers being greater than a first channel quality threshold;
    path loss being less than a first channel quality threshold; or
    size of uplink data being less than or equal to a first transport block size (TBS) threshold.

3. The method according to claim 2, wherein the setting the target transmission type to the small data transmission type based on configured grant comprises:
    setting a small data transmission variable to true.

4. The method according to claim 2, wherein the method further comprises:
    indicating that a lower layer performs an uplink data transmission process of the small data transmission type based on the configured grant, according to at least one of following:
    the target transmission type being set to the small data transmission type based on the configured grant; or
    a small data transmission variable taking a value true.

5. The method according to claim 1, wherein the setting, by the terminal, the target transmission type according to at least one of the following comprises: setting the target transmission type to the small data transmission type based on the random access according to at least one of following:
    a small data transmission resource based on the random access having been configured;
    a measured value to which downlink path loss refers being greater than a second channel quality threshold;
    path loss being less than a second channel quality threshold;
    size of uplink data being less than or equal to a second transport block size (TBS) threshold; or
    no fallback indication having been received from a lower layer, wherein the fallback indication is used to indicate that an uplink data transmission process of the small data transmission type based on the random access has been ended or canceled.

6. The method according to claim 5, wherein the setting the target transmission type to the small data transmission type based on the random access comprises:
    setting a small data transmission variable to true.

7. The method according to claim 5, wherein the method further comprises:
    indicating that a lower layer performs an uplink data transmission process of the small data transmission type based on the random access, according to at least one of following:
    the target transmission type being set to the small data transmission type based on the random access; or
    the small data transmission variable taking a value true.

8. The method according to claim 1, wherein the setting, by the terminal, the target transmission type according to at least one of following comprises: setting the target transmission type to the random access type according to at least one of the following:
    no small data transmission resource based on configured grant having been configured;
    no small data transmission resource based on random access having been configured;

a small data transmission resource based on configured grant being invalid;

a measured value to which downlink path loss refers being not greater than a first channel quality threshold;

path loss being greater than a first channel quality threshold;

a measured value to which downlink path loss refers being not greater than a second channel quality threshold;

path loss being greater than a second channel quality threshold;

size of uplink data being greater than a first TBS threshold;

size of uplink data being greater than a second TBS threshold; or a fallback indication being received from a lower layer, wherein the fallback indication is used to indicate that an uplink data transmission process of the small data transmission type based on random access has been ended or canceled; and the setting the target transmission type to the random access type comprises:

setting a small data transmission variable to false.

9. The method according to claim 1, before the setting, by the terminal, the target transmission type according to at least one of following, the method further comprises:

starting a first radio resource control (RRC) connection resume process, wherein the first RRC connection resume process is used for performing uplink data transmission using the small data transmission type based on the configured grant or the small data transmission type based on the random access.

10. The method according to claim 9, wherein the method further comprises:

in a case that a second RRC connection resume process is requested when the first RRC connection resume process is in progress, and that the target transmission type is the small data transmission type based on the configured grant, continuing with the first RRC connection resume process; or starting the second RRC connection resume process; wherein in the case of starting the second RRC connection resume process, the method further comprises:

executing a small data transmission fallback process, wherein the small data transmission fallback process is used to end, cancel, or suspend an uplink data transmission process of the small data transmission type based on the configured grant.

11. The method according to claim 1, wherein in a case that the target transmission type is the small data transmission type based on the configured grant, the method further comprises:

selecting an uplink carrier used for uplink data transmission of the small data transmission type based on the configured grant; wherein the selecting the uplink carrier used for uplink data transmission of the small data transmission type based on the configured grant comprises:

in a first case, selecting supplementary uplink (SUL) as the uplink carrier used for uplink data transmission of the small data transmission type based on the configured grant; and in a second case, selecting normal uplink (NUL) as the uplink carrier used for uplink data transmission of the small data transmission type based on the configured grant; wherein the first case comprises a measured value to which downlink path loss refers being lower than a third channel quality threshold, and the second case is a case other than the first case.

12. The method according to claim 1, wherein in a case that the target transmission type is the small data transmission type based on the configured grant, the method further comprises at least one of the following:

transmitting, by a lower layer of the terminal, a failure indication to an upper layer according to expiry of a first timer;

transmitting, by a lower layer of the terminal, an uplink skip indication to an upper layer according to no protocol data unit to be transmitted being obtained;

setting a first transmission counter to a value 0;

incrementing the first transmission counter by 1 in a case that an upper layer of the terminal receives one failure indication from a lower layer;

executing a small data transmission fallback process in a case that the first transmission counter takes a value equal to a first count threshold;

setting a second transmission counter to a value 0;

incrementing the second transmission counter by 1 in a case that an upper layer of the terminal receives one uplink skip indication from a lower layer; or executing a small data transmission fallback process in a case that the second transmission counter takes a value equal to a second count threshold; wherein the first timer is configured to monitor downlink control information after uplink data transmission of the small data transmission type based on the configured grant is performed; the failure indication is used to indicate that an uplink data transmission process of the small data transmission type based on the configured grant is unsuccessful; the uplink skip indication is used to indicate that uplink skipping has occurred in an uplink data transmission process of the small data transmission type based on the configured grant; the first transmission counter is configured to count failures of the uplink data transmission process of the small data transmission type based on the configured grant; and the second transmission counter is configured to count uplink skips in the uplink data transmission process of the small data transmission type based on the configured grant.

13. The method according to claim 1, wherein in a case that the target transmission type is the small data transmission type based on the random access, the method further comprises at least one of following:

setting the target transmission type to a small data transmission type based on four-step random access according to at least one of following: the target transmission type being set to the small data transmission type based on two-step random access, or a preamble transmission counter taking a value equal to a third count threshold plus 1;

transmitting, by a lower layer of the terminal, a fallback indication to an upper layer in a case that the preamble transmission counter takes a value equal to the third count threshold plus 1;

transmitting, by a lower layer of the terminal, a fallback indication to an upper layer in a case that the preamble transmission counter takes a value equal to a fourth count threshold plus 1; or executing a small data transmission fallback process according to reception by an upper layer of the terminal a fallback indication from a lower layer.

14. The method according to claim 13, wherein the executing the small data transmission fallback process comprises at least one of following:

starting or restarting a second timer, wherein the second timer is configured to indicate a maximum duration for the terminal to perform an RRC connection resume process;

starting sending an RRC resume request message;

setting a small data transmission variable to false;

releasing a small data transmission resource based on the configured grant; or discarding a stored small data transmission resource based on the configured grant; and the executing the small data transmission fallback process further comprises:

in a case that the first transmission counter takes a value equal to a first count threshold, releasing the small data transmission resource based on the configured grant, or discarding the stored small data transmission resource based on the configured grant; or in a case that the first transmission counter takes a value equal to the first count threshold, releasing the small data transmission resource based on the configured grant, and discarding the stored small data transmission resource based on the configured grant; and/or the executing the small data transmission fallback process further comprises:

in a case that the second transmission counter takes a value equal to a second count threshold, releasing the small data transmission resource based on the configured grant, or discarding the stored small data transmission resource based on the configured grant; or in a case that the second transmission counter takes a value equal to the second count threshold, releasing the small data transmission resource based on the configured grant, and discarding the stored small data transmission resource based on the configured grant.

15. The method according to claim 1, wherein before the setting, by the terminal, the target transmission type according to at least one of following, the method further comprises: receiving configuration information, wherein the configuration information is used for configuring at least one of following for the terminal:

a small data transmission resource based on the configured grant;

a small data transmission resource based on four-step random access; or a small data transmission resource based on two-step random access.

16. The method according to claim 15, wherein the configuration information is further used for configuring at least one of following for the terminal:

a first channel quality threshold, wherein the first channel quality threshold is for the terminal to set the target transmission type to the small data transmission type based on the configured grant;

a second channel quality threshold, wherein the second channel quality threshold is for the terminal to set the target transmission type to the small data transmission type based on the random access;

a third channel quality threshold, wherein the third channel quality threshold is for the terminal to select SUL as an uplink carrier used for uplink data transmission of the small data transmission type based on the configured grant;

the fourth channel quality threshold, wherein the fourth channel quality threshold is for the terminal to set the target transmission type to a small data transmission type based on the two-step random access;

a first TBS threshold, wherein the first TBS threshold indicates a maximum TBS corresponding to the terminal performing small data transmission using the small data transmission type based on the configured grant;

a second TBS threshold, wherein the second TBS threshold indicates a maximum TBS corresponding to the terminal performing small data transmission using the small data transmission type based on the random access;

a third TBS threshold, wherein the third TBS threshold indicates a maximum TBS corresponding to the terminal performing small data transmission using the small data transmission type based on the two-step random access;

a first count threshold, wherein the first count threshold indicates a maximum count of failures of an uplink data transmission process performed by the terminal by using the small data transmission type based on the configured grant;

a second count threshold, wherein the second count threshold indicates a maximum count of uplink skips in an uplink data transmission process performed by the terminal by using the small data transmission type based on the configured grant;

a third count threshold, wherein the third count threshold indicates a maximum count of failures of small data transmission performed by the terminal by using the small data transmission type based on the two-step random access; or a fourth count threshold, wherein the fourth count threshold indicates a maximum count of failures of small data transmission performed by the terminal by using a small data transmission type based on the four-step random access.

17. A terminal, comprising a processor, a memory, and a program or instructions stored in the memory and executable on the processor, wherein the program or instructions, when executed by the processor, cause the terminal to perform:

setting a target transmission type according to at least one of following: network configuration, path loss, size of uplink data, or fallback indication, wherein the target transmission type comprises one of a small data transmission type based on configured grant, a small data transmission type based on random access, and a random access type; wherein in a case that the target transmission type is the small data transmission type based on random access, the program or instructions, when executed by the processor, cause the terminal to further perform;

setting the target transmission type to a small data transmission type based on two-step random access according to at least one of: a measured value to which downlink path loss refers being greater than a fourth channel quality threshold; or a small data transmission resource based on two-step random access having been configured;

or, setting the target transmission type to a small data transmission type based on four-step random access according to at least one of: a measured value to which downlink path loss refers being not greater than the fourth channel quality threshold; or a small data transmission resource based on four-step random access having been configured.

18. The terminal according to claim 17, wherein the program or instructions, when executed by the processor, cause the terminal to perform:

setting the target transmission type to the small data transmission type based on the random access according to at least one of following:

a small data transmission resource based on the random access having been configured;

a measured value to which downlink path loss refers being greater than a second channel quality threshold;

path loss being less than a second channel quality threshold;

size of uplink data being less than or equal to a second transport block size (TBS) threshold; or no fallback indication having been received from a lower layer, wherein the fallback indication is used to indicate that an uplink data transmission process of the small data transmission type based on the random access has been ended or canceled.

19. A non-transitory readable storage medium, wherein the non-transitory readable storage medium stores a program or instructions, and the program or instructions, when executed by a processor of a terminal, causes the terminal device to perform:

setting a target transmission type according to at least one of following: network configuration, path loss, size of uplink data, or fallback indication, wherein the target transmission type comprises one of a small data transmission type based on configured grant, a small data transmission type based on random access, and a random access type; wherein in a case that the target transmission type is the small data transmission type based on random access, the program or instructions, when executed by the processor, cause the terminal to further perform;

setting the target transmission type to a small data transmission type based on two-step random access according to at least one of: a measured value to which downlink path loss refers being greater than a fourth channel quality threshold; or a small data transmission resource based on two-step random access having been configured;

or, setting the target transmission type to a small data transmission type based on four-step random access according to at least one of: a measured value to which downlink path loss refers being not greater than the fourth channel quality threshold; or a small data transmission resource based on four-step random access having been configured.

20. The non-transitory readable storage medium according to claim 19, wherein the program or instructions, when executed by the processor, cause the terminal to perform:

setting the target transmission type to the small data transmission type based on the random access according to at least one of following:

a small data transmission resource based on the random access having been configured;

a measured value to which downlink path loss refers being greater than a second channel quality threshold;

path loss being less than a second channel quality threshold;

size of uplink data being less than or equal to a second transport block size (TBS) threshold; or no fallback indication having been received from a lower layer, wherein the fallback indication is used to indicate that an uplink data transmission process of the small data transmission type based on the random access has been ended or canceled.

* * * * *